United States Patent [19]
Fleenor

[11] Patent Number: 6,022,062
[45] Date of Patent: Feb. 8, 2000

[54] VEHICLE CARGO BED LINER WITH CARGO STABILIZING MEANS

[76] Inventor: Jonathan Kyle Fleenor, 211 O.O. Moore Rd., Chuckey, Tenn. 37641

[21] Appl. No.: 09/100,417

[22] Filed: Jun. 20, 1998

[51] Int. Cl.[7] .............................. B62D 33/00; B60J 7/00
[52] U.S. Cl. .......................... 296/39.2; 296/183; 410/90; 410/94
[58] Field of Search ................... 296/39.2, 183; 410/94, 90, 80

[56] References Cited

U.S. PATENT DOCUMENTS

| | | | |
|---|---|---|---|
| 4,162,098 | 7/1979 | Richardson, III | 296/39.2 |
| 4,181,349 | 1/1980 | Nix et al. | 296/39.2 |
| 4,215,898 | 8/1980 | Ulics | 296/183 |
| 4,333,678 | 6/1982 | Munoz et al. | 296/39.2 |
| 4,341,412 | 7/1982 | Wayne | 296/39.2 |
| 5,188,418 | 2/1993 | Walworth, Jr. et al. | 296/183 |
| 5,549,428 | 8/1996 | Yeatts . | |
| 5,597,193 | 1/1997 | Conner . | |
| 5,648,031 | 7/1997 | Sturtevant et al. . | |
| 5,655,863 | 8/1997 | Mundt | 296/39.2 X |
| 5,722,711 | 3/1998 | German | 296/39.2 |

*Primary Examiner*—Joseph D. Pape
*Attorney, Agent, or Firm*—Susan F. Wagner

[57] ABSTRACT

The invention disclosed herein is a ribbed vehicle cargo bed, including a vehicle cargo bed liner, which contains a means for stabilizing an object during transport. The stabilizing means is created by a reduced floor rib height in an area shaped to hold a cargo object. The area having reduced rib height is adjacently surrounded by a supporting ridge comprising a plurality of cross sectioned rib walls extending essentially perpendicularly from said floor. The supporting ridge provides a barrier which prevents a suitably shaped object situated atop the (recessed) area from sliding during transportation.

13 Claims, 1 Drawing Sheet

VEHICLE CARGO BED LINER WITH CARGO STABILIZING MEANS

FIELD OF THE INVENTION

The present invention relates to vehicle cargo beds and vehicle cargo bed liners. More particularly, the present invention relates to vehicle cargo beds and vehicle cargo bed liners having means for stabilizing cargo during transport.

BACKGROUND

Truck bed liners thermoformed from plastics such as high density polyethylene (HDPE) are commonly used to protect the surface of a truck bed from being scratched and deformed. Typical truck bed liners are thermoformed to have a ribbed pattern. Each longitudinal rib extends vertically above the base level of the truck bed liner to a height chosen to provide an optimum amount of cushion and protection to the metal truck bed while maintaining a maximum useful cargo height, as defined by the floor of the truck is bed liner and the top of the bed side walls. Such truck bed liners contain alternating longitudinal sections of ribbed and flat surfaces. The flat surfaces of the bed liner make contact with the metal truck bed. Each ribbed surface creates a void between the bed liner and the bed. These voids are beneficial in providing extra protection to the metal bed against deformations by sharp objects, etc.

Although such plastic truck bed liners are beneficial in protecting the metal truck bed, the surface of plastic truck bed liners provide substantially less friction than does a metal truck bed. This reduced surface friction is deleterious for the purpose of transporting cargo on the truck bed. Commonly transported cargo objects such as tool boxes, gasoline cans, tackle boxes, and such, tend to slide across, and topple over on a truck bed covered with a plastic liner, much more than with an unlined metal truck bed during transport.

U.S. Pat. No. 5,648,031 discloses a liquid polymer especially developed for increasing the friction of HDPE or other thermoplastic material. The liquid polymer is used by spraying or otherwise applying the polymer to the surface of the truck bed liner. However, the effectiveness of such liquid topical additives tends to be short-lived due to wear.

U.S. Pat. No. 5,549,428 discloses another approach for stabilizing cargo during transport on a truck bed liner. That patent discloses a set of anti-skid devices that sit atop of the ribbed bed liner and tightly cup around a portion of one of the liner ribs in order to remain stationary. The top side of the anti-skid devices is elevated above the bed liner ribs to provide a raised barrier. When a multiple number of such devices is placed strategically around a cargo object, the object is prohibited from sliding during transport by engaging with at least one of the anti-skid devices. The undesirable aspects of such an anti-skid device is that truck bed liners are manufactured with a broad variety of rib widths, depending on the manufacturer. Therefore, a set of anti-skid devices would fit only a limited number of truck bed liners. The raised anti-skid devices would tend to prohibit the sliding of heavy objects across the devices and positioning objects atop of the devices. Therefore, one would occasionally need to remove the anti-skid devices from the bed.

U.S. Pat. No. 5,597,193 discloses an interlocking truck bed liner having a plurality of perpendicularly intersecting, rectangular-shaped horizontal grooves and a plurality of interlocking panels which fit within the grooves to create vertically extending walls useful for boxing in cargo objects. Such an assembly would be very cumbersome since the vertical wall panels would have to be removed from the bed liner in order to use the floor area blocked off by the interlocking panels for jobs such as hauling truck bed loads of lumber or other large objects requiring use of the entire truck bed.

In light of the above, it would be desirable to provide a permanent means of stabilizing a cargo object atop of a section of a thermoplastic truck bed liner without requiring removal of the stabilizing means in instances where that section of bed liner is needed for other purposes such as hauling large loads requiring essentially all of the bed surface.

SUMMARY OF THE INVENTION

The present invention is a vehicle cargo bed which comprises a cargo bed floor, and a plurality of longitudinal ribs having a full rib height protruding vertically above said floor, with said ribs being positioned sufficiently to provide alternating longitudinal rib sections and floor sections, further comprising an area of said alternating longitudinal rib sections and floor sections having a reduced rib height, wherein said area is adjacently surrounded by a supporting ridge comprising a plurality of cross sectioned walls of said ribs extending essentially perpendicularly from said floor.

DETAILED DESCRIPTION OF THE INVENTION

The applicants have developed a vehicle cargo bed having a permanent cargo stabilizing means. The cargo stabilizing means does not reduce the useful surface area of the vehicle cargo bed, even though it is a permanent, unremovable component of the bed. The cargo stabilizing means of the present vehicle cargo bed is created by an absence of bed ribbing in an area shaped to hold cargo objects. Since the cargo stabilizing means does not vertically extend above the bed, the usefulness of the vehicle cargo bed is not reduced for hauling other objects that do not fit inside the cargo stabilizing means. The recessed area of the present cargo stabilizing means is defined by a portion of the bed liner wherein the ribbing has been eliminated. Therefore, the rib walls immediately adjacent to the recessed area form a supporting ridge which provide a barrier over which a cargo object cannot easily move.

Since the rib height of truck bed liners is typically only about 1 inch (2.5 cm) above the floor, the supporting ridge is no more than about 1 inch (2.5 cm) high. However, it was surprising to find that such a short barrier could provide such a large amount of stability for objects placed on the truck bed liner during quite rambunctious truck driving conditions.

Figure 2:
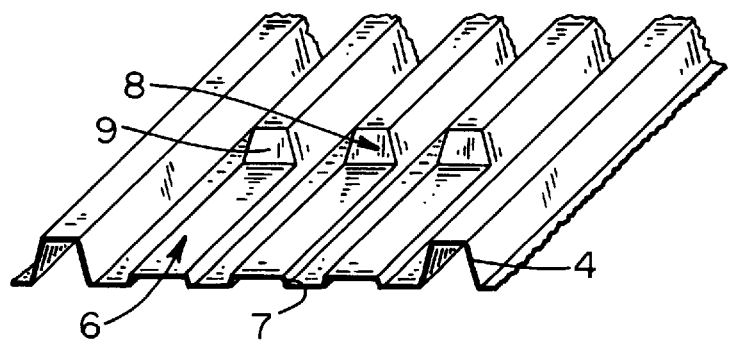
FIG. 2 is an oblique view of a cross section of the same vehicle cargo bed shown in FIG. 1. The cross section is through the cargo stabilizing area.
Figure 1:
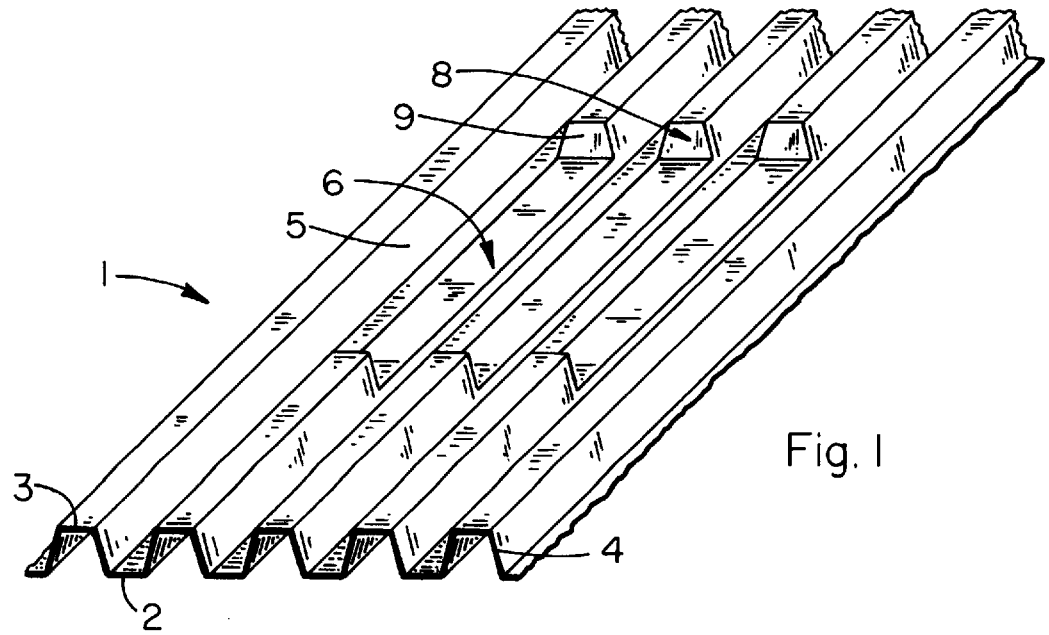
FIG. 1 is an oblique view of a portion of the vehicle cargo bed of the present invention. The cargo stabilizing area illustrated therein has a rectangular shape.

Reference is here made to FIG. 1 and FIG. 2 for illustration of the following description. The vehicle cargo bed of the present invention 1 comprises a floor 2 and a plurality of longitudinal ribs 3 having a full rib height 4 extending vertically above the floor 2 in a manner providing alternating longitudinal rib sections and floor sections. The vehicle cargo bed of the present invention is characterized by a cargo stabilizing means 5 including a recessed area 6 wherein the longitudinal ribs 3 have a reduced rib height 7. The recessed area 6 is adjacently surrounded by a supporting ridge 8 formed by a plurality of rib walls 9 extending essentially perpendicularly from the floor 2. The preferred full rib height 4 is about 0.25 to 1 inch (0.6 to 2.5 cm), with the reduced rib height 7 being between 0 to about 50 percent of the full rib height 4, as measured with the understanding that a 0 percent of the full rib height is vertically level with the floor 2. The more preferred reduced rib height 7 is between 0 to 25 percent of the full rib height 4, with about 0 percent being most preferred.

Even though the supporting ridge 8 contains floor 2 section gaps between the full height rib walls 9, the supporting ridge 8 provides sufficient stabilizing support to a cargo object as long as the floor 2 sections running longitudinally between the rib sections 3 are not too wide. Preferred floor 2 section width is about 0.5 to 3 inches (1.3 to 7.6 cm), more preferably about 0.5 to 1.5 inches (1.3 to 3.8 cm). The supporting ridge 8 completely surrounds the recessed area 6 of the cargo stabilizing means 5. In the case where the recessed area abuts against a side wall of the vehicle or the vehicle cargo bed, such a wall would be considered as part of the supporting ridge.

The full height rib walls 9 that form the supporting ridge 8 extend from the floor 2 at an angle sufficient to provide a barrier effect to prevent a cargo object from sliding across the supporting ridge 8. The walls 9 are essentially perpendicular to the floor 2.

The recessed area of the cargo stabilizing means of the present invention is preferably substantially shaped to accommodate commonly transported cargo objects. The most useful recess area shapes are circular, square, and rectangular shapes. However, the shape can be formed to support any object. The size of the recessed area is also an unlimiting aspect of the present invention. The inventors contemplate that the most useful embodiment of the present invention for general pick-up truck use will include recess areas shaped to hold common 5 to 10 gallon (18.9 to 37.8 liter) capacity containers having a lowermost diameter of about 10 to 30 inches (25.4 to 76.2 cm).

The recessed area of the present cargo stabilizing means can be situated at any position on the vehicle cargo bed. The most useful position for situating such a recessed area in truck bed liners is at the cab end of the bed.

Figure 3:
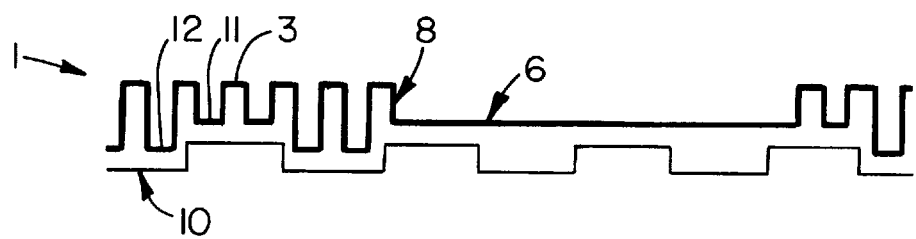
FIG. 3 is an exploded cross section end view of a vehicle bed liner of the present invention having three horizontal levels and positioned atop of a vehicle cargo bed having two horizontal levels, as would be done in normal use of a bed liner. The vehicle bed liner is shown to contain the cargo stabilizing area of the present invention.

The vehicle cargo bed of the present invention is defined herein to include both vehicle bed liners as well as permanent vehicle beds, but a bed liner is preferable because the lateral rib and floor sections of a bed liner are typically narrower than the rib and floor sections of a permanent vehicle bed. Therefore, the discontinuous support ridge would provide more support if formed in a bed liner. Custom bed liners often have three main horizontal surface levels instead of just two. Custom liners may have two levels corresponding to the curvature of the permanent vehicle cargo bed plus an additional protective level. Therefore, the "floor" of a protective bed liner is herein defined as including any horizontal surface of the liner which would essentially make contact with a permanent vehicle bed when installed. FIG. 3 shows an exploded view of a custom bed liner of the present invention atop a permanent ribbed vehicle bed 10. In such a bed liner, the vertically highest floor level 11 is considered to be 0 percent of the full rib height level 4. The lowest floor level 12 does not provide support for the cargo stabilizing means 5.

A bed liner floor may be formed to contact both the ribs and the floor of a permanent bed when installed. The vehicle cargo bed of the present invention may be made from any durable material. A thermoformable material is preferred when the vehicle cargo bed is a bed liner. A hard, strong plastic is most preferable, especially high density polyethylene (HDPE) or high molecular weight polyethylene. The recessed area 6 of the cargo stabilizing means may optionally be treated with a material to increase the surface friction.

The present invention includes a process of thermoforming the vehicle bed liner of the present invention. The process of the present invention includes thermoforming a sheet of thermoform plastic about a mold at a sufficiently high temperature, preferably to about 290° F. (161° C.). The thermoforming mold has the same characteristics of the vehicle cargo bed of the present invention and is included as part of the present invention. The mold of the present invention is preferably made from wood, fiberglass, or aluminum.

The present invention further includes a process of using the vehicle cargo bed of the present invention. The present process includes situating an object in the cargo stabilizing means of the vehicle cargo bed of the present invention, with the object having a lowermost shape substantially similar to the shape of the recessed area of the cargo stabilizing means. The present process further includes transporting the object in an upright position by moving the vehicle cargo bed under transportation conditions of velocity and incline sufficient to allow the object to remain situated in the cargo stabilizing means during transport.

The present invention is further illustrated by the following example. However, the example should not be construed as a limitation thereon.

EXAMPLE

A ribbed truck bed liner was thermoformed from high density polyethylene (HDPE) to contain two 0.25 inch (0.64 cm) deep recessed areas from the highest vertical point in the liner ribs. The recess areas were formed in very close proximity to the cab wall of the truck bed liner approximately behind the driver position and primary passenger position of the truck. The first recessed area was a 11.6 inch (29.5 cm) diameter circular area. The second recessed area was a rectangular area having dimensions of 8.4×12 inches (21.3×30.5 cm). The truck bed liner was then placed atop of a permanent pick-up truck bed.

A 5-gallon (18.9 liter) round uncovered bucket containing 2.5 gallons (9.5 liters) of water was positioned in the first recessed area. A 5-gallon (18.9 liter) vented plastic gasoline container containing 3 gallons (11.4 liters) of water was positioned in the second recessed area. The base of the containers fit comfortably into the recessed areas so that a minimal amount of sliding would occur. The 5-gallon bucket had a base diameter of 10.5 inches (26.7 cm). The plastic gasoline container had base dimensions of 8.25×11.9 inches (21.0×30.2 cm).

The pick-up truck was driven under abnormally sever driving conditions over steep hills and around sharp corners at speeds up to 60 miles per hour at acceleration up to 60 miles per hour in 6 seconds and deceleration from 60 to 0 miles per hour in about 6 seconds. Neither of the containers toppled over or slid out of their respective recessed areas on the truck bed liner. This illustrates the fact that a relatively short support ridge (0.25 inch in this example) provides a great deal of stability to cargo objects.

I claim:

1. A vehicle cargo bed comprising:

a cargo bed floor having a first plurality of ribs protruding transversely therefrom to a first rib height and extending longitudinally across said cargo bed floor, each of said first plurality of ribs lying generally parallel to and spaced apart from each other to provide a ribbed surface, a portion of said first plurality of ribs including a second plurality of ribs adjacently positioned to each other, each of said second plurality of ribs having a recessed longitudinal rib section having a second rib height less than said first rib height, wherein each of said longitudinal rib sections has a length defined by a first and second rib end wall extending from said second rib height to said first rib height at an angle essentially perpendicular to said cargo bed floor, said recessed longitudinal rib sections of said second plurality of ribs being positioned sufficiently adjacent to each other so that said first and second rib end walls of said rib sections are aligned with each other defining a recessed area in said ribbed surface for stabilizing the lateral movement of a cargo item.

2. The vehicle cargo bed of claim 1 wherein said second rib height is sufficiently less than said first rib height and said second plurality of ribs are spaced in sufficiently close proximity to each other so that said rib end walls are capable of preventing said cargo item from sliding out of said recessed area while being transported atop said vehicle cargo bed.

3. The vehicle cargo bed of claim 2 wherein said first rib height is about 0.6 to about 2.5 cm and said second rib height is from 0 to about 50 percent of said first rib height, as measured perpendicularly from said cargo bed floor.

4. The vehicle cargo bed of claim 2 wherein said second plurality of ribs are spaced apart from each other at a distance of about 1.3 to about 7.6 cm.

5. The vehicle cargo bed of claim 1 wherein said recessed area has a circular shape, a rectangular shape, or a square shape.

6. A vehicle cargo bed liner comprising:

a liner floor having a first plurality of ribs protruding transversely therefrom to a first rib height and extending longitudinally across said liner floor, each of said first plurality of ribs lying generally parallel to and spaced apart from each other to provide a ribbed surface, a portion of said first plurality of ribs including a second plurality of ribs adjacently positioned to each other, each of said second plurality of ribs having a recessed longitudinal rib section having a second rib height less than said first rib height, wherein each of said recessed longitudinal rib sections has a length defined by a first and second rib end wall extending from said second rib height to said first rib height at an angle essentially perpendicular to said liner floor, said recessed longitudinal rib sections of said second plurality of ribs being positioned sufficiently adjacent to each other so that said first and second rib end walls of said rib sections are aligned with each other defining a recessed area in said ribbed surface for stabilizing the lateral movement of a cargo item, said vehicle cargo bed liner being positionable atop a vehicle cargo bed.

7. The vehicle cargo bed liner of claim 6 wherein said second rib height is sufficiently less than said first rib height and said second plurality of ribs are spaced in sufficiently close proximity to each other so that said rib end walls prevent said cargo item from sliding out of said recessed area.

8. The vehicle cargo bed liner of claim 7 wherein said first rib height is about 0.6 to about 2.5 cm and said second rib height is from 0 to about 50 percent of said first rib height, as measured perpendicularly from said liner floor.

9. The vehicle cargo bed liner of claim 7 wherein said second plurality of ribs are spaced apart from each other at a distance of about 1.3 to about 7.6 cm.

10. The vehicle cargo bed liner of claim 6 wherein said recessed area has a circular shape, a rectangular shape, or a square shape.

11. The vehicle cargo bed liner of claim 6 wherein said vehicle cargo bed liner is formed from a thermoform material or a plastic.

12. The vehicle cargo bed liner of claim 6 further wherein said liner floor has a third plurality of ribs protruding transversely therefrom in a direction opposite said first and second plurality of ribs.

13. A process of forming a vehicle cargo bed liner comprising:

thermoforming a sheet of thermoform plastic about a mold having a shape of a vehicle cargo bed including a cargo bed floor having a first plurality of ribs protruding transversely therefrom to a first rib height and extending longitudinally across said cargo bed floor, each of said first plurality of ribs lying generally parallel to and spaced apart from each other to provide a ribbed surface, a portion of said first plurality of ribs including a second plurality of ribs adjacently positioned to each other, each of said second plurality of ribs having a recessed longitudinal rib section having a second rib height less than said first rib height, wherein each of said recessed longitudinal rib sections has a length defined by a first and second rib end wall extending from said second rib height to said first rib height at an angle essentially perpendicular to said cargo bed floor, said recessed longitudinal rib sections of said second plurality of ribs being positioned sufficiently adjacent to each other so that said first and second rib end walls of said rib sections are aligned with each other defining a recessed area in said ribbed surface.

* * * * *